July 14, 1931.                B. JACOBSEN                1,814,389

CHALK LINE HOLDER

Filed Nov. 6, 1928

B. Jacobsen
Inventor
By C A Snow & Co.
Attorneys.

Patented July 14, 1931

1,814,389

UNITED STATES PATENT OFFICE

BERNHARD JACOBSEN, OF MEEKER, COLORADO

CHALK LINE HOLDER

Application filed November 6, 1928. Serial No. 317,658.

This invention relates to a chalk line holder, the primary object of the invention being to provide a chalk line holder embodying a spool on which the chalk line is wound, and frictional means for retarding movement of the spool to prevent over-running of the spool when the line is being unwound.

Another object of the invention is to provide a chalk line holder of this character wherein the tension exerted on the spool may be regulated, adapting the device for various uses.

Another important object of the invention is the provision of a friction clutch mechanism at one end of the spool to grip the line to hold it against movement after a predetermined length of the line has been unreeled.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
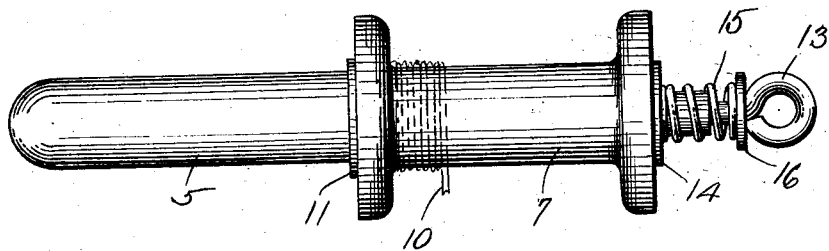
Figure 1 is an elevational view of a chalk line holder constructed in accordance with the invention.
Figure 2:
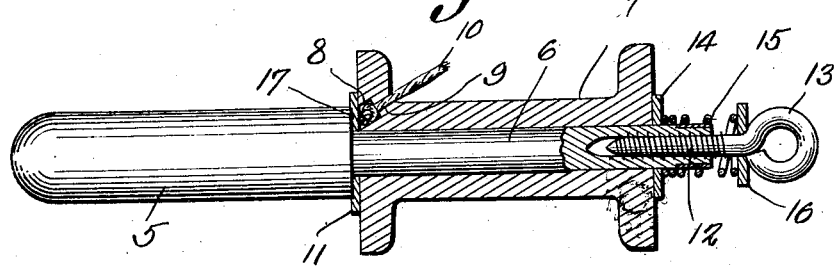
Figure 2 is an elevational view, the spool or reel being shown in section.
Figure 3:
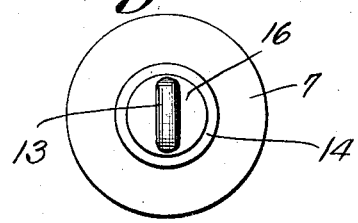
Figure 3 is an end elevational view thereof.

Referring to the drawings in detail, the device includes a handle 5 which is formed with a reduced extension 6 providing a shaft for the reel or spool, which is indicated at 7.

One end of the spool 7 is formed with an angularly disposed bar having an enlarged portion 8, to receive the knot 9 of the line 10, so that the line may be securely fastened to the spool in such a way that no portion of the knot is exposed to the elements. A washer 11 is positioned on the extension 6 adjacent to the inner end of the spool and is adapted to close the enlarged portion of the bore and provide a further protection for the knot held therein.

Formed in one end of the extension 6 is a threaded bore to receive the threaded shank 12 of the screw eye 13. Mounted on the shaft or extension 6 adjacent to the free end of the extension, is a washer 14 that is held into engagement with the outer end of the spool by means of the coiled spring that also bears against the washer 16 mounted on the shank of the eye bolt. Thus it will be obvious that due to this construction the spool will be normally urged inwardly towards the handle 5, and against the shoulder 17 formed at the inner end of the extension 6.

Should it be desired to increase the tension of the spring against the spool, so that a weight may be used on the end of the line and dropped over the side of a building, for example, the screw eye may be rotated to accomplish this result.

Figure 4:
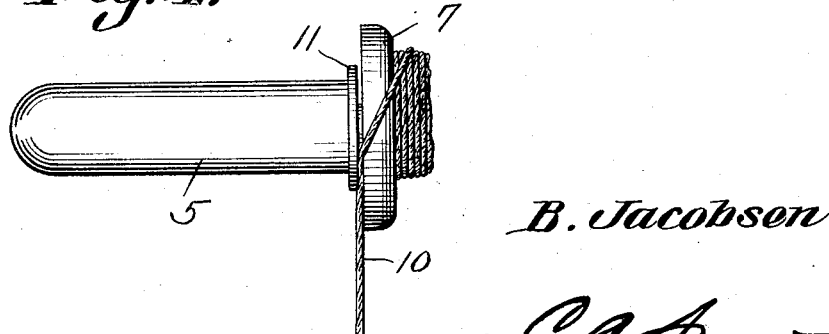
Figure 4 is a fragmental elevational view illustrating the line clutching mechanism.

When a predetermined length of line has been unreeled, it is obvious that the operator may force the spool against the spring 15, by extending the thumb forwardly, moving the spool away from the washer 11. The line may now be forced between the washer 11 and spool 7, in a manner as shown by Figure 4 of the drawings, with the result that the line will be prevented from further unreeling and will be secured without the necessity of tying the line which tends to wear the line and tangle it.

I claim:

In a chalk line holder, a handle, an extension formed integral with the handle and providing a shoulder, said extension having a threaded bore in the end thereof, a washer mounted on the extension and engaging the shoulder, a spool on the extension, said spool having end flanges, one of the flanges having an opening extending through the end thereof, a cord extending through the opening and knotted within the opening, a screw eye fitted in the threaded bore, a washer on the screw eye, a coiled spring on the extension, said spring being held between one end of the spool and the washer of the screw eye, said spring adapted to normally urge the spool into engagement with the washer at the shoulder, and said cord adapted to be held between one end of the spool and washer engaging the shoulder of the handle.

In testimony that I claim the foregoing as my own, I have hereto affixed my signature.

BERNHARD JACOBSEN.